(12) United States Patent
Koehn

(10) Patent No.: US 6,241,085 B1
(45) Date of Patent: *Jun. 5, 2001

(54) FOLDED PAPER BOARD CD CARRIER

(75) Inventor: Annalee Koehn, Chicago, IL (US)

(73) Assignee: R. R. Donnelley & Sons, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,938
(22) Filed: Dec. 10, 1998
(51) Int. Cl.[7] .................................................. B65D 85/57
(52) U.S. Cl. ........................ 206/308.1; 206/312; 206/806
(58) Field of Search .............................. 206/307.1, 308.1, 206/308.3, 309, 311, 312, 806

(56) References Cited

U.S. PATENT DOCUMENTS

| 5,101,973 | 4/1992 | Martinez . |
| 5,154,284 | 10/1992 | Starkey . |
| 5,188,229 | 2/1993 | Bernstein . |
| 5,199,743 | 4/1993 | Rosinski, III . |
| 5,419,433 | 5/1995 | Harrer et al. . |
| 5,421,453 | 6/1995 | Harrer et al. . |
| 5,472,083 | 12/1995 | Robinson et al. . |
| 5,501,540 | 3/1996 | Ho . |
| 5,620,271 | 4/1997 | Bergh et al. . |
| 5,647,482 | 7/1997 | Kleinfelder . |
| 5,662,217 | 9/1997 | Durr . |

Primary Examiner—Paul T. Sewell
Assistant Examiner—Shian Luong
(74) Attorney, Agent, or Firm—Marshall, O'Toole, Gerstein, Murray & Borun

(57) ABSTRACT

A folded paper board CD carrier for carrying a plurality of CD's. A CD carrier formed from a single piece of stock comprises a paper board blank having a central portion divided by a fold line into first and second planar portions. Each portion includes a side edge having a tab and a pair of opposing flaps foldable along a fold line lying perpendicular to the central portion fold line. Each flap is foldable to an inward position wherein the flaps define with their corresponding planar half an enclosure adapted to receive a CD. Upon folding the first and second planar portions along the central portion fold line the enclosures are placed in spaced apart parallel relationship with the side edge tabs of each planar half disposed adjacent each other. The CD carrier so formed requires no glue or other adhesives and will hold a plurality of CD's.

8 Claims, 7 Drawing Sheets

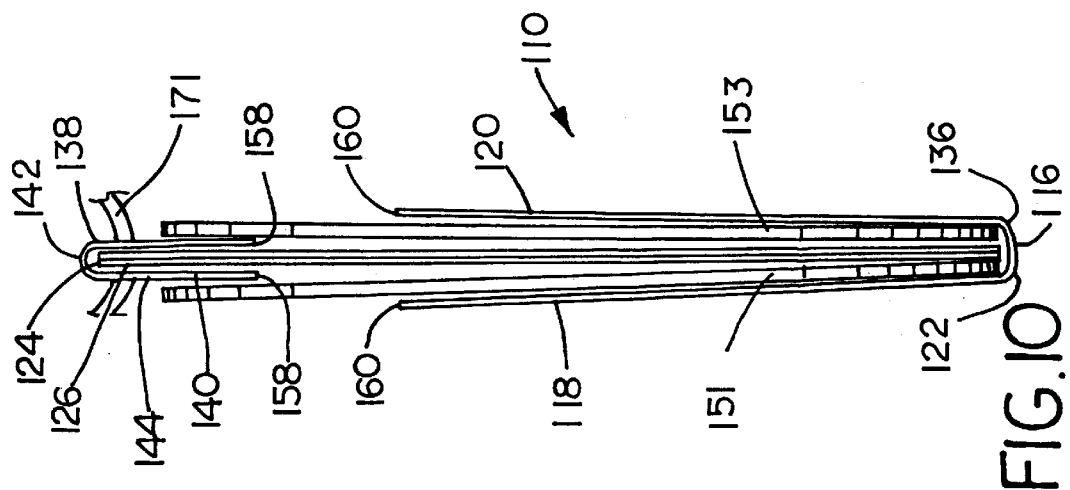
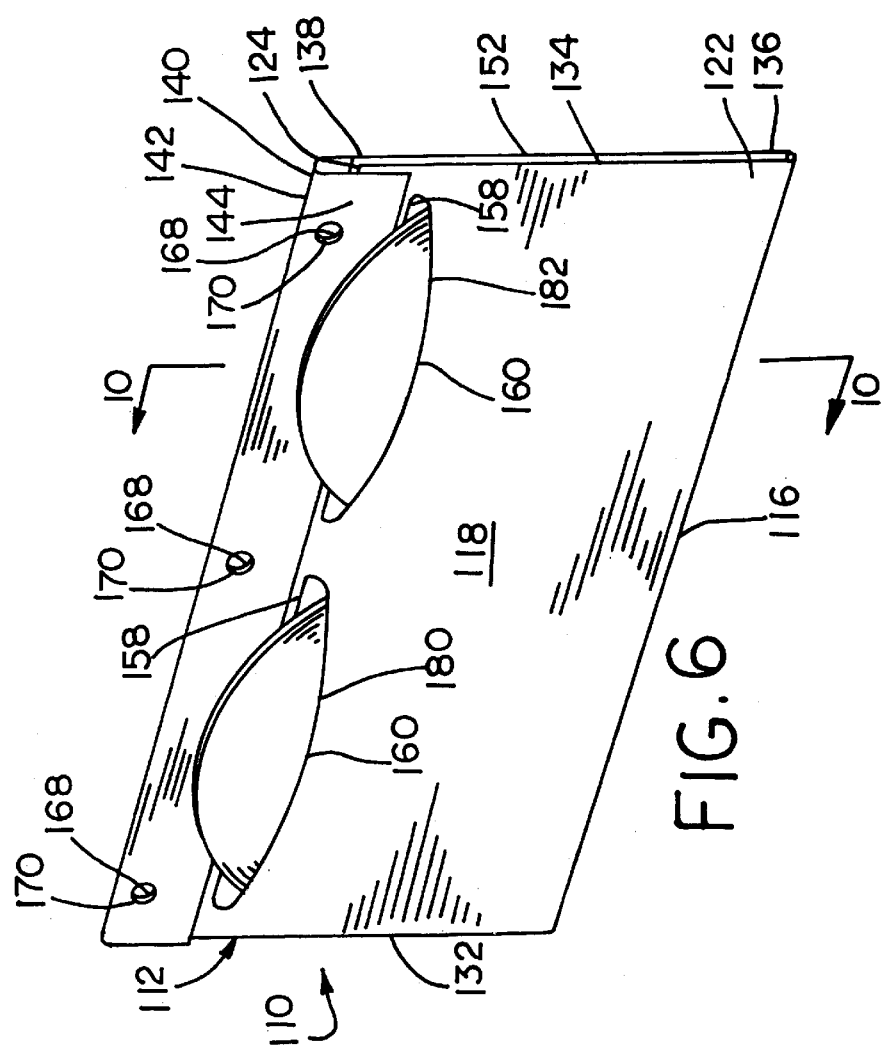

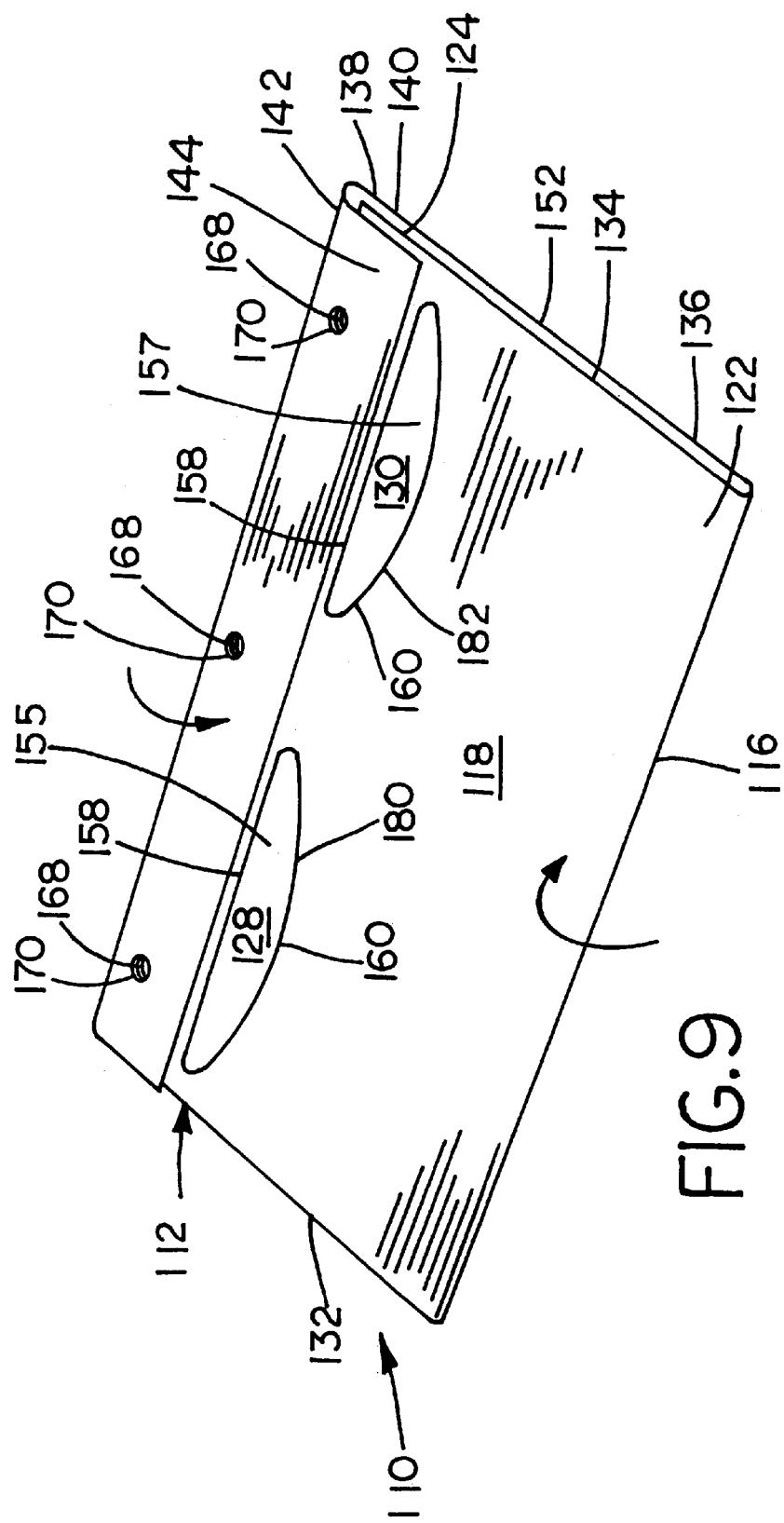

FOLDED PAPER BOARD CD CARRIER

FIELD OF THE INVENTION

The present invention relates to a folded paper board device for carrying compact discs.

BACKGROUND OF THE INVENTION

Compact discs, which are commonly referred to as "CD's" are generally well known in the art. Standard CD's having a diameter of four and three quarters (4¾) inches are commonly used to store prerecorded music, prerecorded video, and data for reading by a computer. Due to technical advances, a CD can store an incredible amount of data and thus CD's are greatly preferred over other storage mediums, such as magnetic recording tape.

Most CD's are packaged in rigid plastic containers or boxes. The rigid containers serve to protect the CD from inadvertent damage, such as scratching or impact damage. However, in actuality the CD's stored therein are relatively durable and thus do not need such a rigid container.

Moreover, the standard container is bulky, has many sharp corners, has a hinge which frequently comes apart or breaks altogether, and is generally disliked by many consumers. Accordingly, many consumers have long desired a more convenient, less bulky and altogether more user friendly alternative for storing CD's.

One solution has been to provide a CD carrier made from paper or from a paperboard material. Such containers are softer, less bulky, and have the added advantage of being made from recycled material. A variety of such folded paper CD carriers have been proposed. For example, U.S. Pat. Nos. 5,419,433 and 5,421,453 show paper board CD carriers formed from a sheet of material which is folded and then glued together to form a pocket sized to hold a CD. However, the gluing process is very difficult to control, and thus many such prior art CD carriers are not well suited for mass production.

Accordingly, there exists a continuing need for an improved paper board CD carrier.

SUMMARY OF THE INVENTION

According to one aspect of the invention, a CD carrier formed from a single piece of stock comprises a paper board blank having a central portion divided or bisected by a fold line into first and second planar portions or halves. Each portion or half includes a side edge having a tab and a pair of opposing flaps foldable along a fold line lying perpendicular to the central portion fold line. Each flap is foldable to an inward position wherein the flaps define with their corresponding planar portion or half an enclosure adapted to receive a CD. Upon folding the first and second planar portions or halves along the central portion fold line the enclosures are placed in spaced apart parallel relationship with the side edge tabs of each planar half disposed adjacent each other. The CD carrier so formed requires no glue or other adhesives and will hold up to two (2) CD's.

In further accordance with a preferred embodiment of the invention, each planar half of the paper board blank includes an insertion cutout sized to receive a CD, thus permitting a CD to be inserted into each of the enclosures. Each insertion cutout is adapted to prevent lateral movement of a CD placed in the enclosure.

One of the side edge tabs preferably includes a locking flap foldable along a fold line. The locking flap locks one side edge tab in its position adjacent the other side edge tab.

Moreover, each of the side edge tabs includes a plurality of apertures adapted to be secured to a ring binder. Preferably, each of the flaps on the first half is separated from the adjacent flaps on the second half by slots or cutouts. The cutouts are adapted to prevent buckling of the carrier upon folding along the central portion fold line. Finally, each of the opposing flaps are preferably long enough to partially overlap each other when folded to the inward position.

In accordance with another aspect of the invention, a CD carrier comprises a generally rectangular central portion being bisected by a fold line into first and second planar halves. Each planar half includes a pair of ends and a pair of interconnecting side edges. One of the side edges of each planar half is defined by the central portion fold line, and the other side edge of each planar half defines a tab. Each end of each planar half is defined in part by a protruding flap foldable along a fold line, with each flap fold line being generally perpendicular to the central portion fold line. The flaps are thus inwardly foldable to define with their adjacent planar half an enclosure adapted to receive a CD. The defined enclosures are thus positionable in spaced apart parallel relationship upon folding the first and second planar halves along the central portion fold line.

In accordance with yet another aspect of the invention, a CD carrier comprises a generally rectangular central portion being bisected by a fold line into first and second planar halves. Each planar half includes a pair of ends, with each end having a protruding flap foldable along a fold line disposed generally perpendicular to the central portion fold line. The flaps are inwardly foldable so that each flap defines with a portion of its corresponding planar half an enclosure adapted to receive a CD, such that each half defines a pair of enclosures. A pair of side edges extend between the ends of each planar half. A side edge of each planar half is defined by the central portion fold line. A pair of coplanar side-by-side enclosures is defined upon the inward folding of the flaps for each planar half. Upon folding along the central portion fold line, the coplanar and side-by-side enclosures formed by each planar half are positionable in spaced apart parallel relationship.

In accordance with a still further aspect of the invention, a folded paper board CD carrier comprises a generally rectangular central portion bisected by a fold line into first and second planar halves. Each planar half includes a pair of ends and first and second interconnecting side edges, with one of the side edges being defined by the central portion fold line. Each end includes a protruding flap foldable along a fold line, with the fold line for each flap being disposed generally perpendicular to the central portion fold line such that the flaps are inwardly foldable to define with their adjacent planar half at least one generally planar enclosure adapted to receive a CD. Upon folding the flaps to the inward position and folding the halves along the fold line, the defined enclosures are positionable in spaced apart parallel relationship.

These and other advantages and features of the invention will become readily apparent to those skilled in the art upon a reading of the following description.

BRIEF DESCRIPTION OF THE DRAWINGS

In the course of the following detailed description, reference will be made to the attached drawings wherein like reference numerals identify like parts and wherein:

FIG. 4 is a perspective view of the CD carrier of FIGS. 1 through 3 shown with the planar halves being folded along the central fold line and with the locking tab being folded along its fold line;

FIG. 5 is a cross-sectional view taken along lines 5—5 of FIG. 1 and showing a CD disposed in each of the spaced apart parallel enclosures; the CD carrier is shown attached to a conventional ring binder;

FIG. 6 is a perspective view of a CD carrier constructed in accordance with the teachings of a second embodiment of the present invention;

FIG. 9 is a perspective view of the CD carrier of FIGS. 6 through 8 shown with the planar halves being folded along the central fold line and with the locking tab being folded along its fold line; and FIG. 10 is a cross-sectional view taken along lines 10—10 of FIG. 6 showing a CD disposed in each of the spaced apart parallel enclosures.

DETAILED DESCRIPTION OF THE PREFERRED EMBODIMENT

The embodiment described herein is not intended to limit the scope of the invention to the precise form disclosed. The embodiment has been chosen and described in order to explain the principles of the invention and its practical use in order to enable others skilled in the art to follow its teachings.

Figure 1:
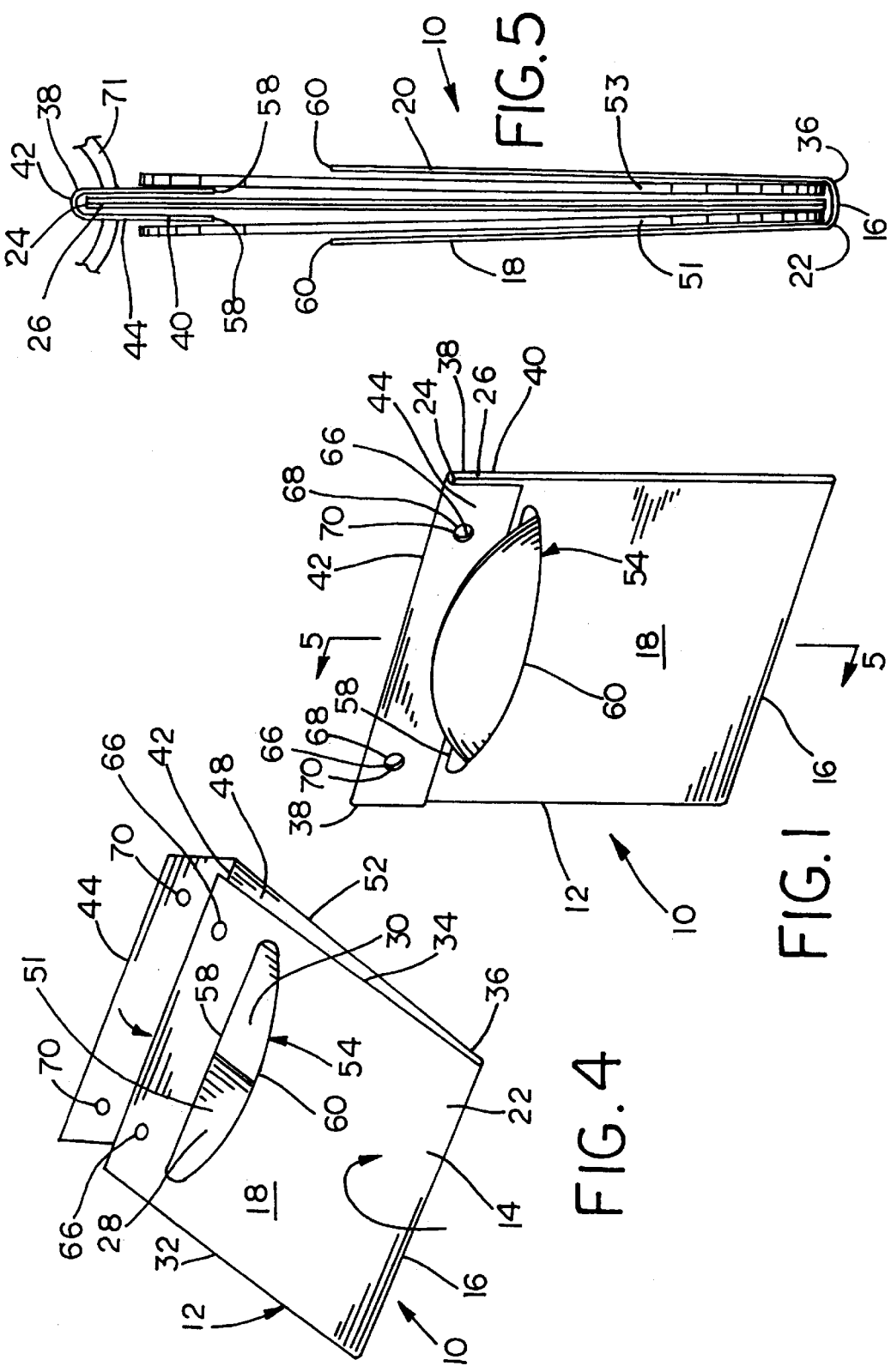
FIG. 1 is a perspective view of a CD carrier constructed in accordance with the teachings of the present invention.
Figure 2:
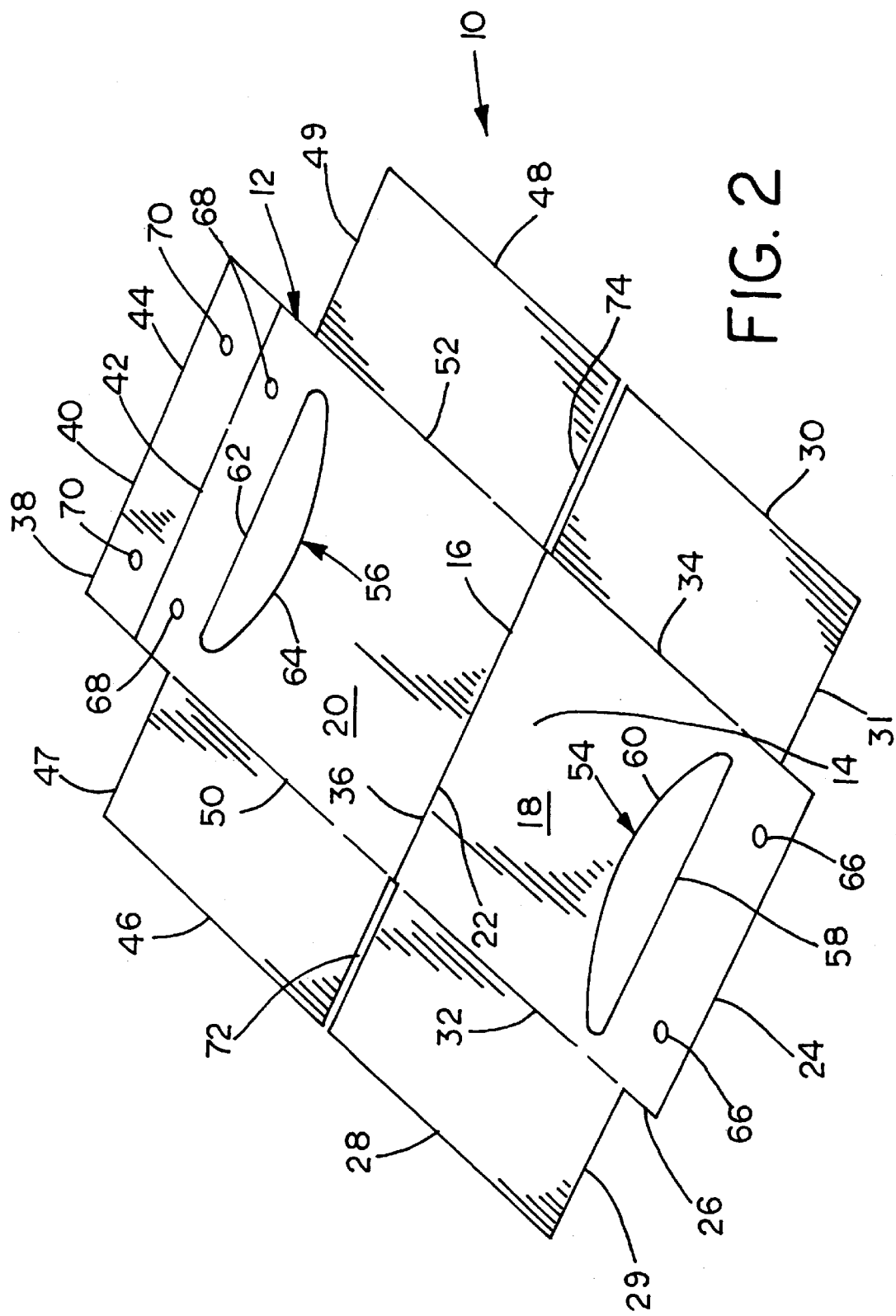
FIG. 2 is a perspective view of the CD carrier of FIG. 1 shown in its unfolded state.

Referring now to FIGS. 1 through 5 of the drawings, a CD carrier constructed in accordance with the teachings of the present invention is generally referred to by the reference numeral 10. As shown in FIG. 2, the CD carrier 10 is constructed of a paper blank 12, which is a single piece of stock and which is preferably constructed of eight (8) point stock. The blank 12 includes a central portion 14 which is generally divided or bisected by a fold line 16 to form a pair of planar portions or halves 18 and 20.

Figure 3:
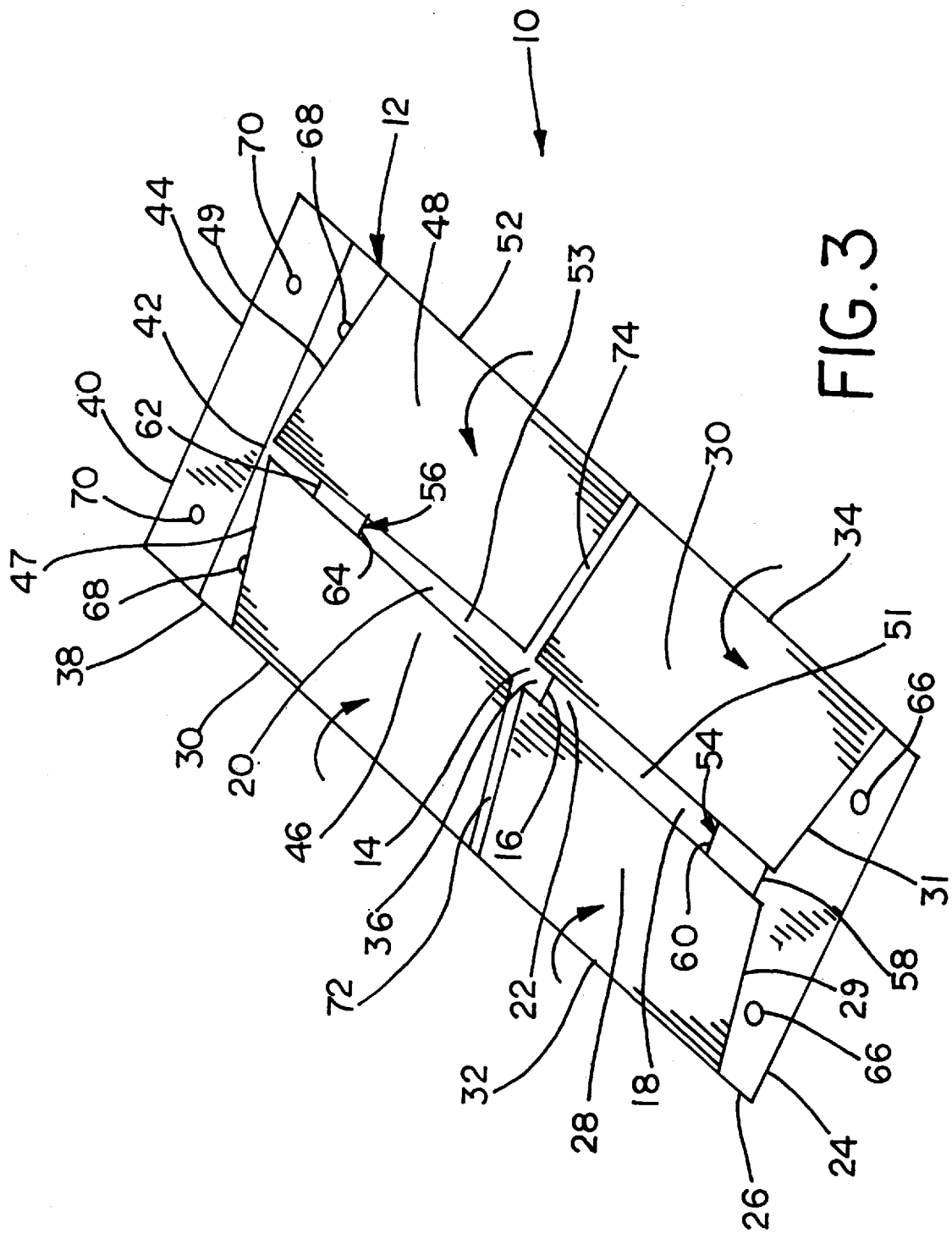
FIG. 3 is a perspective view of the CD carrier of FIGS. 1 and 2 shown in a partially folded state with the flaps folded along their respective fold lines.

The planar half 18 includes an inside edge 22 lying generally contiguous with the fold line 16 and also includes an outside edge 24. The planar half 18 also includes a pair of opposing end flaps 28, 30, each of which is foldable along a fold line 32, 34, respectively. The fold lines 32, 34 are preferably substantially perpendicular to the fold line 16, with normal angular deviations therefrom being tolerated. The flap 28 includes an edge 29, while the flap 30 includes an edge 31. As shown in FIGS. 2 and 3, all or a portion of the outside edge 24 protrudes outwardly past the edges 29, 31 to form a tab 26.

The planar half 20 includes an inside edge 36 lying generally contiguous with the fold line 16 and also includes an outside edge 38. The tab 40 is preferably longer than the tab 26, the purpose of which will be explained in greater detail below. The tab 40 also includes a fold line 42, such that an outer portion of the tab 40 is foldable along the fold line 42 to form a retaining or locking tab 44. The planar half 20 includes a pair of opposing end flaps 46, 48, each of which is foldable along a fold line 50, 52, respectively. The fold lines 50, 52 preferably are substantially perpendicular to the fold line 16. Again, normal angular deviations therefrom will be tolerated. The flap 46 includes an edge 47, while the flap 48 includes an edge 49. As shown in FIGS. 2 and 3, all or a portion of the outside edge 38 protrudes outwardly past the edges 29, 31 to form a tab 40.

As shown in FIGS. 3 and 4, the flaps 28 and 30 are foldable along the fold lines 32 and 34, respectively. Similarly, the flaps 46 and 48 are inwardly foldable along their respective fold lines 50 and 52. When folded inwardly to the position of FIG. 3, the flaps 28 and 30 define with the planar half 18 an enclosure 51, while the flaps 46 and 48 define with the planar half 20 an enclosure 53. Each of the enclosures is sized to hold therein a standard CD such that movement of the CD is substantially prevented. Preferably, the flaps are all slightly longer than ½ of the width of their corresponding planar half 18, 20, such that the opposing flaps 28, 30 and 46, 48 slightly overlap each other. Shorter flaps may be used, but the length disclosed is preferred in that such a length will minimize scratching of CD's held within the carrier 10.

As shown in FIGS. 1 and 4, the blank 12 is folded along the fold line 16 (subsequent to the inward folding of the flaps 28, 30, 46 and 48 to create the enclosures 51 and 53).

Each of the planar halves 18, 20 includes an insert aperture or cutout 54, 56, respectively (see FIG. 2). The cutout 54 includes a generally straight edge 58 with an interconnecting arcuate or curved edge 60, while the cutout 56 includes a generally straight edge 62 with an interconnecting arcuate or curved edge 64. Each of the cutouts 54, 56 are sized so that a standard, commercially available CD having a nominal diameter of 4¾ inches will fit through the cutout. The cutouts 54, 56 will provide an avenue for inserting a CD into the enclosures 51 and 53, respectively.

As can be seen in FIG. 2, a pair of apertures 66 are located on the tab 26 adjacent the edge 24 of half 18, while a pair of apertures 68 are located on tab 40 adjacent the edge 38. Another pair of apertures 70 are located on the locking tab 44. An aperture from each of the pairs of apertures 66, 68 and 70 will be aligned with corresponding apertures from the other pairs when the CD carrier is in the folded state of FIGS. 1 and 5. The apertures 66, 68, and 70 are adapted to permit the CD carrier to be attached to the rings 71 of a ring binder (not shown) or other supporting structure.

Preferably, a cutout 72 is located between adjacent flaps 28 and 46, while a cutout 74 is located between adjacent flaps 30 and 48. Although the cutouts 72 and 74 may be dispensed with, the cutouts 72 and 74 provide for better folding along the fold line 16 by reducing buckling and or bunching of the paper stock when the blank 12 is folded. The cutouts 72, 74 also permit the flap 28 to be folded independently of the flap 46, and permit the flap 30 to be folded independently of the flap 48. Also, preferably, each of the cutouts 54, 56, the apertures 66, 68, and 70, and the cutouts 72 and 74 are formed by stamping of the blank 12 using well accepted and conventional practices.

It will be appreciated that the CD carrier 10 preferably is formed from a single paper blank 12. The cutouts 54, 56, 72, and 74, as well as the apertures 66, 68 and 70 are all preferably stamped or otherwise cut from the blank 12 using well accepted practices as previously mentioned. For purposes of efficiency in forming the CD carrier 10, each of the fold lines 16, 32, 34, 42, 50 and 52 are preferably machine formed using well known and commercially available folding machines and techniques. Alternatively, each of the above-described fold lines may be formed using a series of aligned perforations, or by using other well known methods which may be well suited to forming a foldable line or hinge.

In operation, the CD carrier 10 may be prepared for use as follows.

The enclosure 51 is prepared by folding the flaps 28 and 30 inwardly along the fold lines 32 and 34, respectively, while the enclosure 53 is prepared by folding the flaps 46 and 48 inwardly along the fold lines 50, 52, which changes the CD carrier 10 from the configuration shown in FIG. 2 to the configuration shown in FIG. 3. The CD carrier 10 is then folded along the fold line 16 from the configuration shown in FIG. 3 to the configuration shown in FIG. 4, with the side edges 24 and 38, and tabs 26 and 40 being generally adjacent to each other. In such a configuration, corresponding ones of the apertures 66 and 68 are aligned.

The locking tab 44 is then folded along the fold line 42 in order to overlap and thus secure the tab 26 in its position adjacent to the tab 40 with the side edges 24 and 38 also disposed adjacent each other. When the locking tab 44 is folded over, the apertures 70 are aligned with corresponding ones of the previously aligned apertures 66 and 68. The CD carrier will now assume the configuration of FIG. 1 with the enclosures 51 and 53 being disposed in generally spaced apart side-by-side and parallel relationship substantially as shown in FIG. 5. A CD (such as is shown in each of FIGS. 1 and 5) may now be inserted into each of the enclosures 51 and 53 through their respective insertion cutouts 54 and 56. Preferably, the CD carrier may now be attached (with or without the CD's inserted therein) to the rings 71 of a ring binder (not shown) for storage and/or transport.

It will be appreciated that the CD carrier 10, by virtue of the above described construction, does not require any glues, adhesives or binders whatsoever, and further does not require any form of mechanical fasteners.

Figure 7:
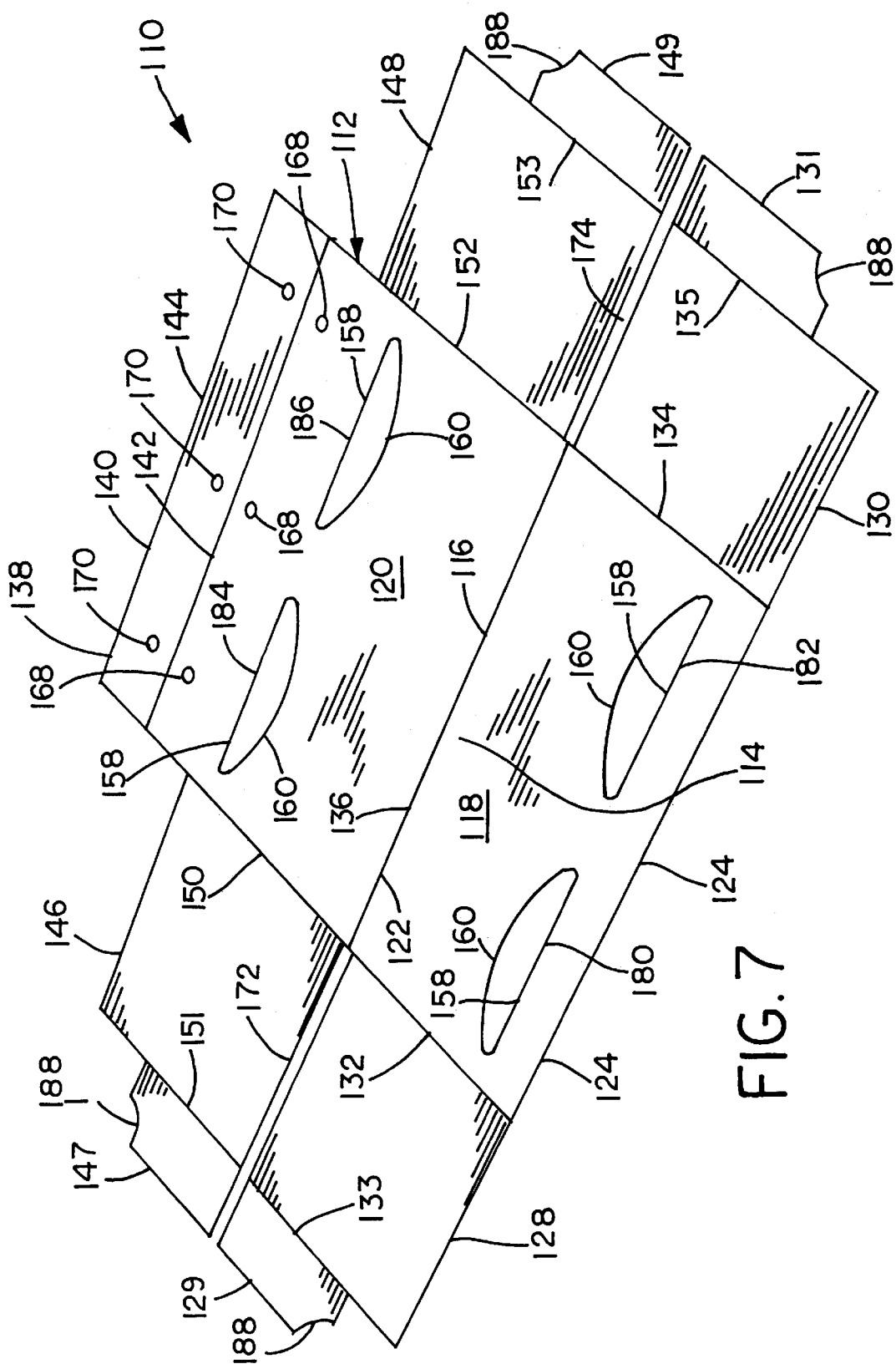
FIG. 7 is a perspective view of the CD carrier of FIG. 6 shown in its unfolded state.

Referring now to the embodiment of FIGS. 6 through 10, a CD carrier constructed in accordance with the teachings of a second embodiment of the present invention is generally referred to by the reference numeral 110. As shown in FIG. 7, the CD carrier 110 is constructed of paper blank 112, which is formed from a single piece of stock and which as outlined above is preferably constructed of eight point stock. The blank 112 includes a central portion 114 which is generally divided or bisected by a fold line 116 to form a pair of planar portions or halves 118 and 120. The planar half 118 includes an inside edge 122 lying generally contiguous with the fold line 116 and also includes an outside edge 124. The planar half 118 also includes a pair of opposing flaps or panels 128, 130, each of which is foldable along a fold line 132, 134, respectively. The fold lines 132, 134 are preferably substantially perpendicular to the fold line 116, with normal angular deviations therefrom being tolerated. Each panel 128, 130 also includes an end tab 129, 131, respectively. Each tab 129, 131 is foldable along a fold line 133, 135, respectively. The fold lines 133, 135 are generally parallel to the fold lines 132, 134.

Figure 8:
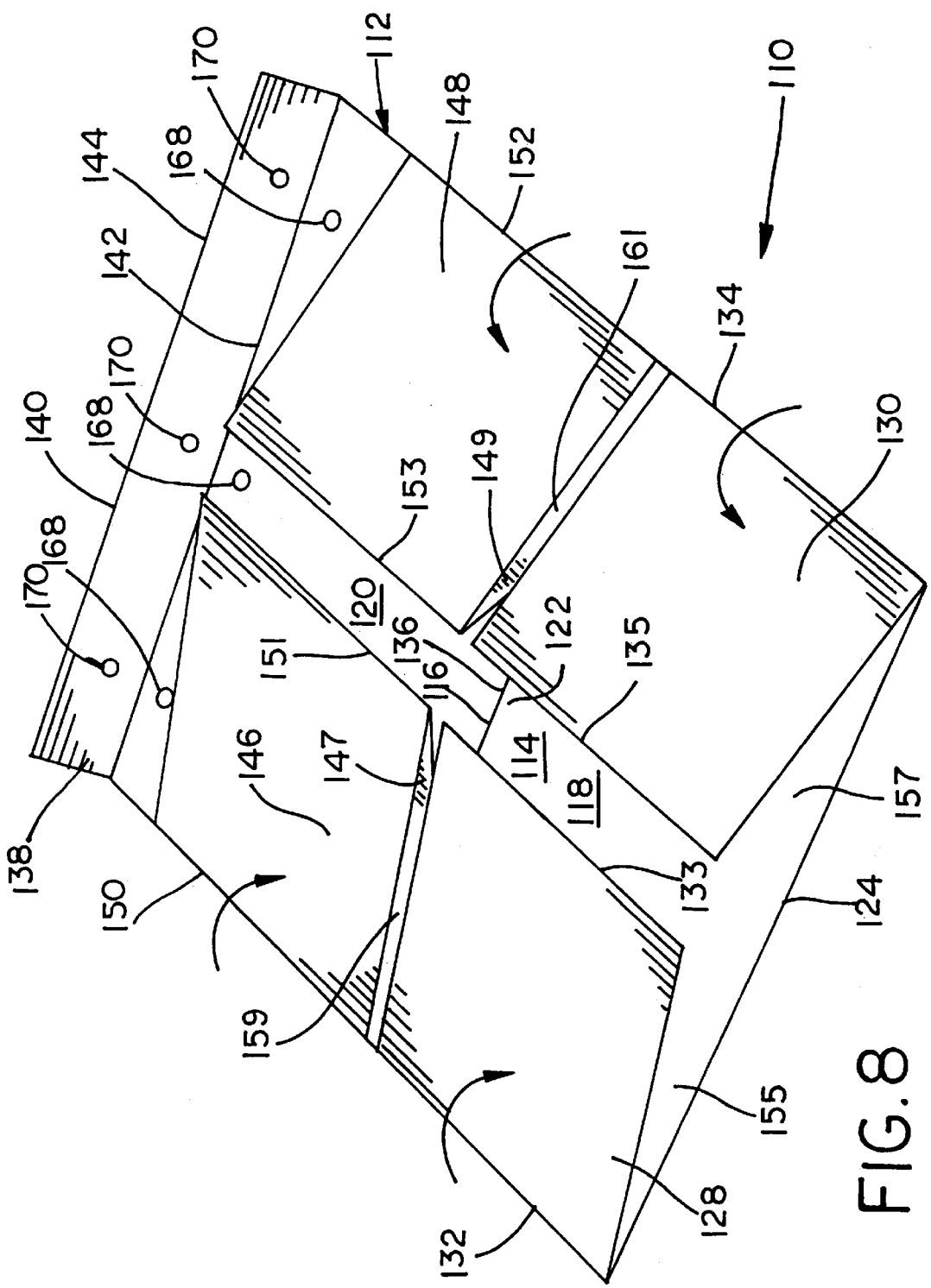
FIG. 8 is a perspective view of the CD carrier of FIGS. 6 and 7 shown in a partially folded state.

The planar half 120 includes an inside edge 136 lying generally contiguous with the fold line 116 and further includes an outside edge 138. A portion of the outside edge 138 protrudes outwardly to form a tab 140. The tab 140 includes a fold line 142, such that an outer portion of the tab 140 is foldable along the fold line 142 to form a retaining or locking tab 144. The planar half 120 also includes a pair of opposing flaps or panels 146, 148, each of which is foldable along a fold line 150, 152, respectively. The fold lines 150, 152 preferably are substantially perpendicular to the fold line 116. Each panel 146, 148 also includes an end tab 147, 149, respectively. Each tab 147, 149 is foldable along a fold line 151, 153, respectively. The fold lines 151, 153 are generally parallel to the fold lines 150, 152. As shown in FIGS. 7 and 8, tabs 129, 131, 147 and 149 are inwardly foldable along their respective fold lines 133, 135, 151, and 153. Note that in FIG. 8, by virtue of the cutouts 188, each of the tabs 129 and 131 are concealed from view. Subsequently, the panels 128, 130, 146, and 148 are foldable along their respective fold lines 132, 134, 150, and 152. When folded inwardly to the position of FIGS. 8 and 9, each panel forms with an adjacent portion of its respective planar half an enclosure. Specifically, the panels 128, 130 form enclosures 155, 157 with their respective planar half 118. Similarly, the panels 146, 148 form with their respective planar half 120 the enclosures 159, 161. The end tab 129 serves to define a lateral edge of the enclosure 155, while the tab 131 serves to define a lateral edge of the enclosure 157. Similarly, the tab 147 serves to define a lateral edge of the enclosure 159, while the tab 149 serves to define a lateral edge of the enclosure 161. Each of the enclosures is sized to hold therein a standard CD such that movement of the CD is substantially prevented. Preferably, the panels 128, 130, 146 and 148 are all substantially equal to the diameter of a standard CD, or roughly equal to ½ of the lengthwise dimension of their corresponding planar half 118, 120.

As shown in FIGS. 6, 8 and 9, the enclosures 155, 157, 159, and 161 are created from the blank 112 by first inwardly folding the tabs 129, 131, 147, and 149, followed by the inward folding of the panels 128, 130, 146, and 148. As can be appreciated from FIGS. 7 through 9, when the components described above are folded, the enclosures 155 and 157 are generally coplanar, while the enclosures 159 and 161 are likewise coplanar. It will further be appreciated that the pair of enclosures 155 and 157 is disposed in spaced apart and parallel relationship with the pair of enclosures 159 and 161. The CD carrier 110 is thus equipped to carry four (4) CD's.

The planar half 118 includes a pair of insertion apertures or cutouts 180, 182, while the planar half 120 includes a pair of insertion apertures or cutouts 184, 186, respectively. Each cutout 180, 182, 184, and 186 is sized to receive a standard CD, and includes a generally straight edge 158 with an interconnecting arcuate or curved edge 160. As can be seen in FIG. 7, each of the tabs 129, 131, 147 and 149 includes an arcuate cutout 188, which is located and sized so that none of the tabs will interfere with their adjacent cutouts 180, 182, 184, 186 when the tabs are in the inwardly folded position.

As can be seen in FIGS. 7 and 8, a series of apertures 168 is located on the tab 140 adjacent the edge 138. Another series of apertures 170 is located on the locking tab 144. As can be seen in FIG. 9, the series of apertures 168, 170 will be aligned with each other when the locking tab 144 is folded to the position of FIG. 9. The apertures 168 and 170 are adapted to permit the CD carrier 110 to be attached to the rings of a ring binder (not shown) or other supporting structure.

Preferably, a cutout 172 is located between adjacent panels 128 and 146, while a cutout 174 is located between adjacent panels 130 and 148. Although the cutouts 172 and 174 may be dispensed with, the cutouts 172 and 174 provide for better folding along all of the fold lines by reducing buckling. The cutouts 172, 174 also permit the panels and the tabs to be folded independently of each other.

What is claimed:

1. A CD carrier, comprising:

a central portion being bisected by a fold line into first and second planar halves, each planar half including:

a pair of ends, each of the ends being foldable along a fold line disposed perpendicular to the central portion fold line and having a protruding flap foldable along a fold line disposed generally perpendicular to the central portion fold line, the flap and the corresponding end cooperating with a portion of the planar half to define an enclosure, the flap being inwardly foldable to define an inner boundary of the corresponding enclosure, each enclosure being adapted to receive a CD; and a pair of side edges extending between the end panels, one of the side edges being defined by the central portion fold line;

whereby a pair of coplanar side-by-side enclosures are defined upon the inward folding of the flaps and the end panels for each planar half, and further whereby the pair of side-by-side enclosures of the first planar half are positioned adjacent the pair of side-by-side enclosures of the second planar half upon folding the central portion along the fold line.

2. The CD carrier of claim 1, wherein one of the side edges of one of the planar halves includes a locking flap foldable along a fold line and adapted to lock the pair of side edges together.

3. The CD carrier of claim 1, wherein at least one of the side edges of one of the planar halves includes a plurality of perforations adapted to be secured to a ring binder.

4. The CD carrier of claim 1, wherein each planar half includes an insertion cutout corresponding to each enclosure, each insertion cutout sized to receive a CD, each insertion cutout being adapted to prevent lateral movement of a CD placed in the enclosure.

5. The CD carrier of claim 1, wherein at least one of the side edges includes a plurality of apertures adapted to be supported on a ring binder.

6. The CD carrier of claim 1, wherein the other one of the side edges of each planar half includes a tab portion, the tab portion being adapted to be secured to a support structure, the tab portions of each planar half being disposed generally adjacent each other upon folding along the central portion fold line.

7. A CD carrier, comprising:

a central portion being bisected by a fold line into first and second planar halves, each planar half including:

a pair of ends, each end having a protruding flap foldable along a fold line disposed generally perpendicular to the central portion fold line, each of the flaps including an outer end having an end tab, and each of the end tabs being foldable along a fold line disposed parallel to the flap fold line, the flaps being inwardly foldable so that each flap defines with a portion of the corresponding planar half an enclosure with each of the end tabs defining an inner boundary of the corresponding enclosure, each enclosure being adapted to receive a CD; and a pair of side edges extending between the ends, one of the side edges being defined by the central portion fold line;

whereby the first planar half defines a first pair of coplanar side-by-side enclosures formed upon the inward folding of the flaps for the first planar half, and whereby the second planar half defines a second pair of coplanar side-by-side enclosures formed upon the inward folding of the flaps for the second planar half, and further whereby the first pair of side-by side enclosures are positioned generally parallel to the second pair of side-by-side enclosures upon folding the central portion along the fold line.

8. The CD carrier of claim 7, wherein each planar half includes an insertion cutout corresponding to each enclosure, each insertion cutout sized to receive a CD.

* * * * *